(12) United States Patent
Dornan

(10) Patent No.: US 7,861,840 B1
(45) Date of Patent: Jan. 4, 2011

(54) ANTI-BACK DRIVE SYSTEM

(75) Inventor: Arthur E. Dornan, Ypsilanti, MI (US)

(73) Assignee: Winzeler Gear, Inc., Harwood Heights, IL (US)

( * ) Notice: Subject to any disclaimer, the term of this patent is extended or adjusted under 35 U.S.C. 154(b) by 0 days.

(21) Appl. No.: 12/853,381

(22) Filed: Aug. 10, 2010

(51) Int. Cl.
 *F16D 51/00* (2006.01)
 *B60T 7/12* (2006.01)
(52) U.S. Cl. .................. 192/223; 188/134
(58) Field of Classification Search .......... 192/223, 192/223.1
 See application file for complete search history.

(56) References Cited

U.S. PATENT DOCUMENTS

| | | | | |
|---|---|---|---|---|
| 905,912 | A * | 12/1908 | Nehring | 192/223 |
| 1,686,682 | A * | 10/1928 | Coughlin | 192/223.3 |
| 1,997,646 | A * | 4/1935 | Miller | 192/223.4 |
| 2,447,167 | A * | 8/1948 | Davis et al. | 192/223.2 |
| 3,237,735 | A * | 3/1966 | Jayne | 192/223 |
| 3,307,663 | A * | 3/1967 | Luenberger | 192/223 |
| 3,587,796 | A * | 6/1971 | Nestvogel | 192/223 |
| 4,413,713 | A * | 11/1983 | West | 192/223 |
| 4,480,733 | A | 11/1984 | Grimm et al. | |
| 4,953,676 | A * | 9/1990 | Yamada et al. | 192/223.4 |
| 7,140,151 | B2 | 11/2006 | Spaziani et al. | |
| 2001/0042670 | A1* | 11/2001 | Schuster | 192/223 |
| 2009/0315380 | A1 | 12/2009 | Nae | |

\* cited by examiner

*Primary Examiner*—Rodney H Bonck
(74) *Attorney, Agent, or Firm*—Donald J. Ersler

(57) ABSTRACT

An anti-back drive system preferably includes a drive housing, a drive ring, a lock ring and an output pinion. The drive housing includes a drive counterbore. The drive housing is secured to an electric motor. The drive ring preferably includes a base member and a plurality of drive projections. The drive ring is secured to a drive shaft of the electric motor. The lock ring includes a plurality of inward facing cam surfaces and a plurality of inward facing loop projections. The output pinion includes a drive gear and a plurality of drive fingers, which extend radially outward from the output pinion. The plurality of inward facing cam surfaces are sized to receive an end perimeter of said plurality of drive fingers. A push on clip is secured to the drive shaft to retain the drive ring, the lock ring and the output pinion on the drive shaft.

18 Claims, 5 Drawing Sheets

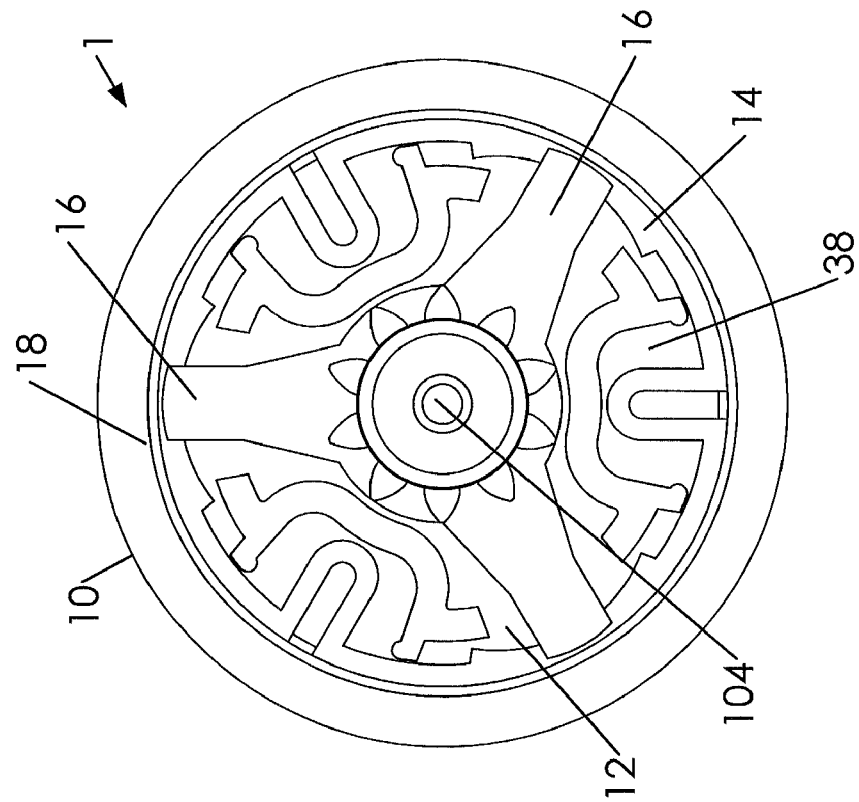
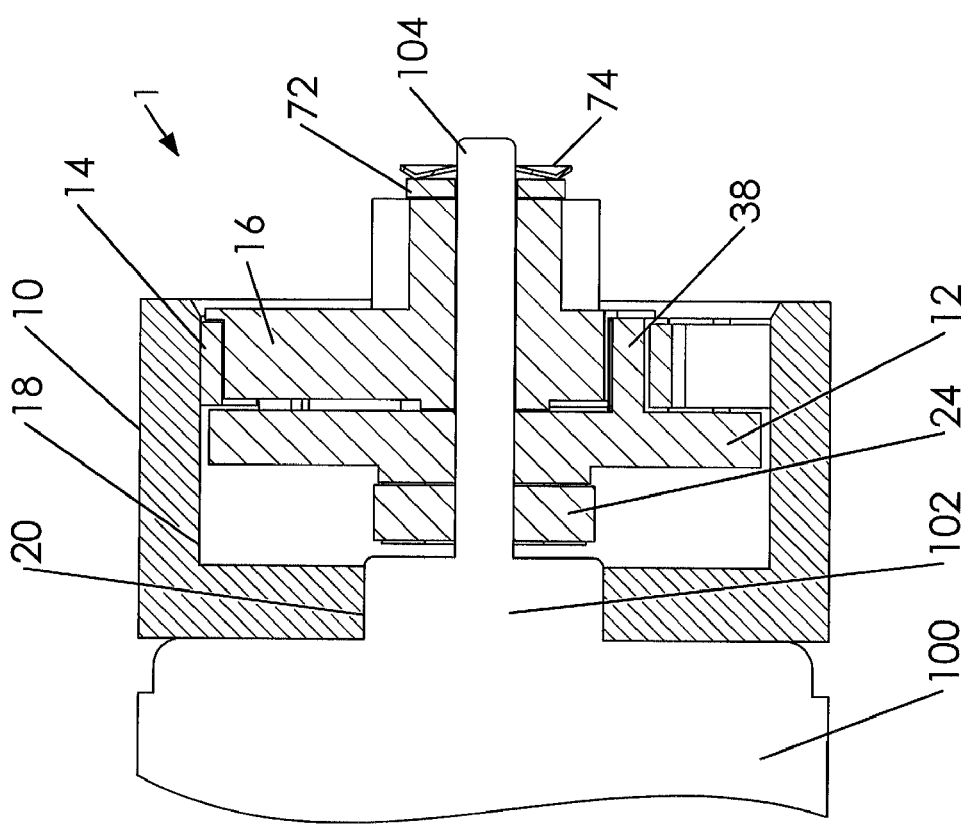

ANTI-BACK DRIVE SYSTEM

BACKGROUND OF THE INVENTION

1. Field of the Invention

The present invention relates generally to gear drives and more specifically to an anti-back drive system, which is less complicated than that of the prior art.

2. Discussion of the Prior Art

There are at least three different types of anti-back drive systems, which prevent a drive system from reversing rotation of a gear, after the drive device ceases rotation. Anti-back drive systems are commonly used to slide windows in motor vehicles up and down. A ratchet mechanism may be used to prevent back drive of a gear as shown in U.S. Pat. No. 4,480,733. U.S. Pat. No. 4,480,733 to Grimm et al. discloses an energy absorbing bi-directional ratchet no-back apparatus. The Grimm et al. patent discloses an energy absorbing ratchet for a bi-directional no-back apparatus which includes in combination a fixed support, a rotatable input member and a rotatable output member.

A worm gear is commonly used to prevent back drive of a gear as shown in U.S. Pat. No. 7,140,151. U.S. Pat. No. 7,140,151 to Spaziani et al. discloses an electro-mechanical actuator. The Spaziani et al. patent includes a window lift mechanism including a plurality of motors for driving an output shaft. A clutch spring mechanism is also commonly used to prevent back drive. Patent application no. 2009/0315380 to Nae discloses an anti-back drive device for releasably securing a seat back with respect to a seat cushion. The Nae patent application includes an upper gear plate affixed to the seat back and defines gear teeth. A lower gear plate is secured to a seat bottom and defines gear teeth that cooperate with the upper plate gear teeth.

Accordingly, there is a clearly felt need in the art for an anti-back drive system, which includes a less complicated construction than that of the prior art.

SUMMARY OF THE INVENTION

The present invention provides an anti-back drive system, which is less complicated than that of the prior art. The anti-back drive system preferably includes a drive housing, a drive ring, a lock ring and an output pinion. The drive housing preferably includes a drive counterbore and a boss bore. The boss bore is formed through a bottom of the drive counterbore. The boss bore is sized to receive a shaft boss of a motor housing. A drive shaft of an electric motor extends from the shaft boss. The drive housing is secured to the electric motor. The drive counterbore is sized to rotatably receive an outside diameter of the lock ring. A drive dog is preferably pressed to substantially a bottom of the drive shaft.

The drive ring preferably includes a base member, a dog boss and a plurality of drive projections. The dog boss extends from one end of the base member and the plurality of drive projections extend from the other end of the base member. The dog boss includes a dog cavity, which is sized to receive the drive dog. Each drive projection includes a clockwise drive member and a counterclockwise drive member. The lock ring includes a plurality of inward facing loop projections and a plurality of inward facing cam surfaces. Each inward facing cam surface is formed between two adjacent inward facing loop projections.

The output pinion includes a plurality of drive fingers and a drive gear. The plurality of drive fingers extend radially outward from the output pinion. A lip retainer extends from an end of each drive finger and axially retains the drive ring. The plurality of inward facing cam surfaces are sized to receive an outer contact perimeter of said plurality of drive fingers. The output pinion includes a gear shaft bore, which is sized to receive the drive shaft. A washer is placed on the drive shaft and in contact with the drive gear. A push on clip is secured to the drive shaft to retain the drive ring, the lock ring and the output pinion on the drive shaft.

Accordingly, it is an object of the present invention to provide an anti-back drive system, which includes a less complicated construction than that of the prior art.

These and additional objects, advantages, features and benefits of the present invention will become apparent from the following specification.

BRIEF DESCRIPTION OF THE DRAWINGS

FIG. 1 is a front view of an anti-back drive system in accordance with the present invention.

FIG. 2 is a cross sectional side view of an anti-back drive system in accordance with the present invention.

DETAILED DESCRIPTION OF THE PREFERRED EMBODIMENTS

Figure 6:
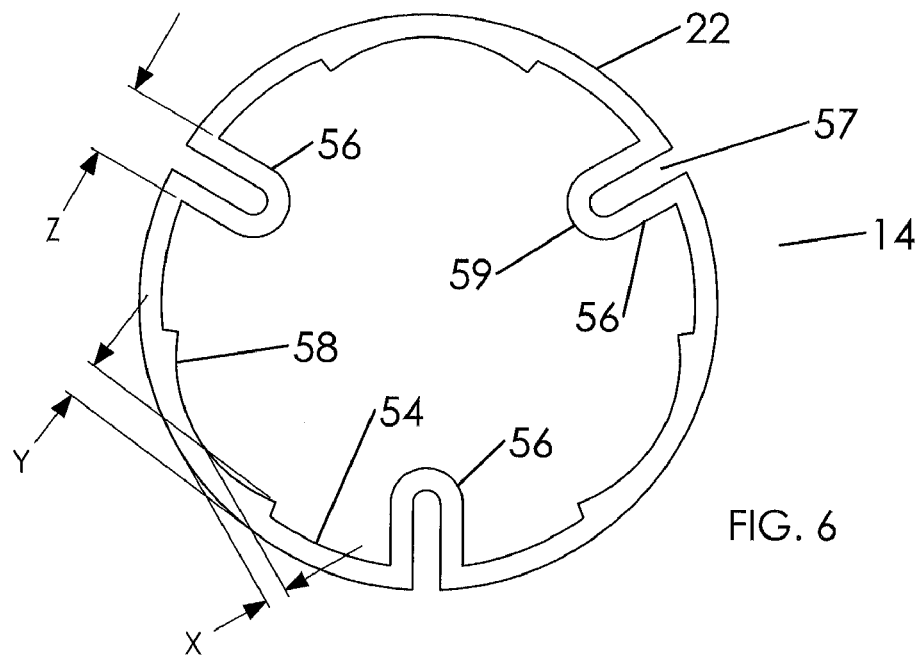
FIG. 6 is a front view of a lock ring of an anti-back drive system in accordance with the present invention.

With reference now to the drawings, and particularly to FIG. 1, there is shown a front view of an anti-back drive system 1. With reference to FIG. 2, the anti-back drive system 1 preferably includes a drive housing 10, a drive ring 12, a lock ring 14 and an output pinion 16. The drive housing 10 preferably includes a drive counterbore 18 and a boss bore 20. The boss bore 20 is formed through a bottom of the drive counterbore 18. The boss bore 20 is preferably sized to receive a motor housing shaft boss 102 of an electric motor 100. A drive shaft 104 of the electric motor 100 extends from the motor housing shaft boss 102. The drive housing 10 is secured to the electric motor 100 with any suitable method, such as press fitting the boss bore 20 to the motor housing shaft boss 102 or fasteners. With reference to FIG. 6, the drive counterbore 18 preferably has a slight interference fit with an outside perimeter 22 of the lock ring 14.

Figure 3:
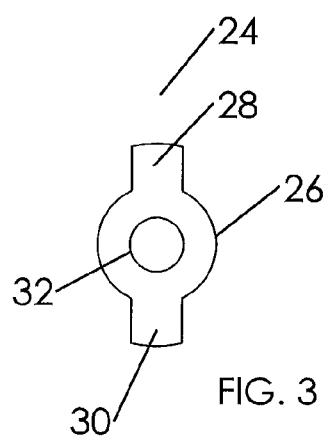
FIG. 3 is a front view of a drive dog of an anti-back drive system in accordance with the present invention.

With reference to FIG. 3, a drive dog 24 includes a base 26, a first leg 28, a second leg 30 and a shaft hole 32. The first leg 28 extends from one side of the base 26 and the second leg 30 extends from an opposing side of the base 26. The shaft hole 32 is formed through the base 26 for a press fit with the drive shaft 104. The drive dog 24 is preferably pressed to substantially a bottom of the drive shaft 104.

Figure 4:
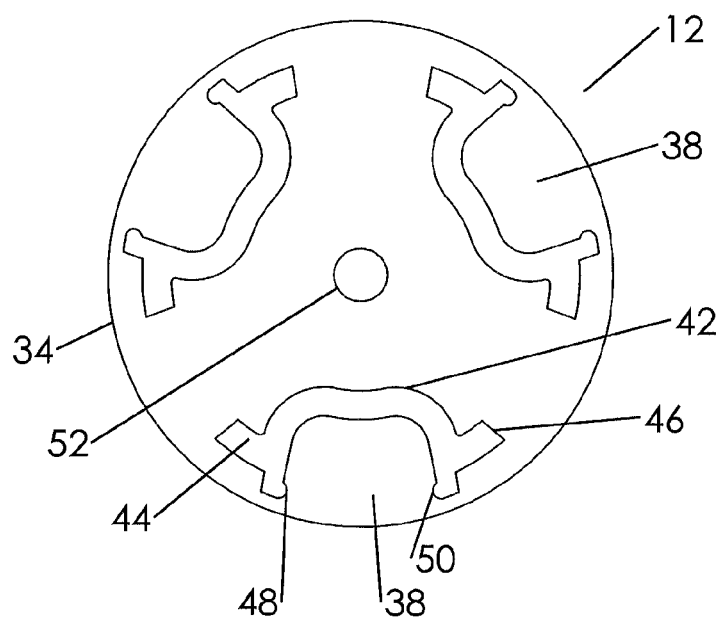
FIG. 4 is a front view of a drive ring of an anti-back drive system in accordance with the present invention.
Figure 5:
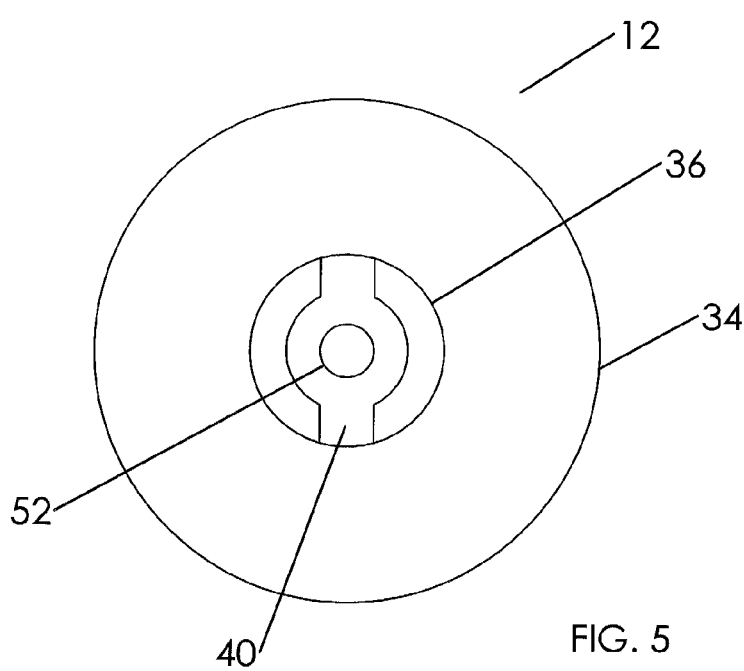
FIG. 5 is a rear view of a drive ring of an anti-back drive system in accordance with the present invention.

With reference to FIGS. 4-5, the drive ring 12 preferably includes a base member 34, a dog boss 36 and a plurality of drive projections 38. The dog boss 36 extends from one end of the base member 34 and the plurality of drive projections 38 extend from the other end of the base member 34. The dog boss 36 includes a dog cavity 40, which is sized to receive an outer perimeter of the drive dog 24. Each drive projection 38 preferably includes a substantially C-shaped base member 42, a clockwise drive member 44, a counterclockwise drive member 46, counterclockwise ring projection 48 and a clockwise ring projection 50. The clockwise drive member 44 extends from one end of the substantially C-shaped projection 42 and the counterclockwise ring projection 48 extends from substantially behind the clockwise drive member 44. The counterclockwise drive member 46 extends from the other end of the substantially C-shaped projection 42 and the clockwise ring projection 50 extends from substantially behind the counterclockwise drive member 46. A drive shaft bore 52 is formed through the drive ring 12 to firmly receive the drive shaft 104.

With reference to FIG. 6, the lock ring 14 includes the outer perimeter 22, an inner perimeter 54, a plurality of inward facing loop projections 56 and a plurality of inward facing cam surfaces 58. Each inward facing cam surface 58 is formed between two adjacent inward facing loop projections 56. A dimension Y between the outer perimeter 22 and an end of the inward facing cam surface 58 is greater than a dimension X between the outer perimeter 22 and a middle of the inward facing cam surface 58, where Y>X. Each inward facing loop projection 56 includes an open end 57 and a closed end 59.

Figure 7:
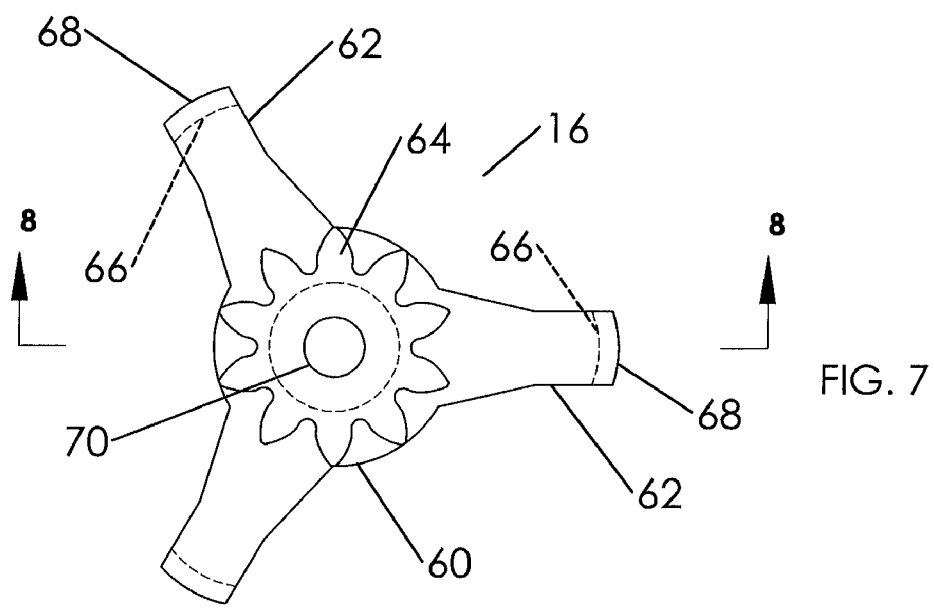
FIG. 7 is a front view of an output pinion of an anti-back drive system in accordance with the present invention.
Figure 8:
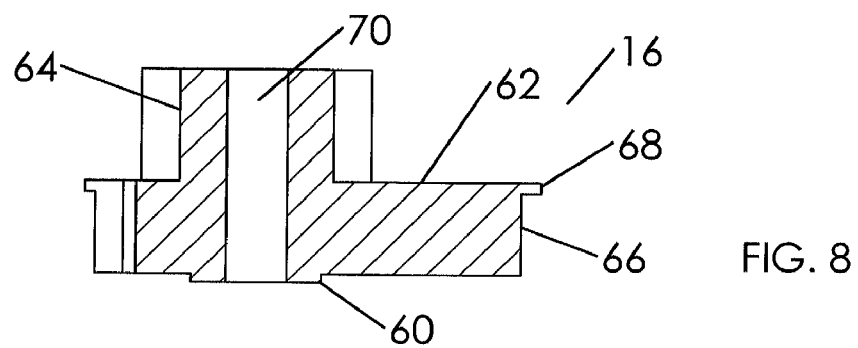
FIG. 8 is a cross sectional view of an output pinion of an anti-back drive system in accordance with the present invention.

With reference to FIGS. 7-8, the output pinion 16 preferably includes a drive base 60, a plurality of drive fingers 62 and a drive gear 64. The plurality of drive fingers 62 extend radially outward from the drive base 60. Each drive finger 62 is terminated with a curved end 66. The curved end 66 is sized to be received by the middle of the inward facing cam surface 58. A perimeter of the plurality of curved ends is substantially concentric with the drive gear. A retainer lip 68 extends from an end of each drive finger 62. A gear shaft bore 70 is formed through the drive base 60 and the drive gear 64.

The lock ring 14 is placed on the output pinion 16 by aligning each drive finger 62 with substantially the middle of each inward facing cam surface 56. The drive shaft 104 is inserted into the gear shaft bore 70. The output pinion 16 and the lock ring 14 are pushed into the drive counterbore 18. The drive ring 14 is retained between the base member 34 of the drive ring 12 and the plurality of retainer lips 68. The drive shaft 104 is inserted into a washer 72. A push on clip 74 is secured to the drive shaft 104 to retain the drive ring 12, the lock ring 14 and the output pinion 16 on the drive shaft 104.

Figure 9:
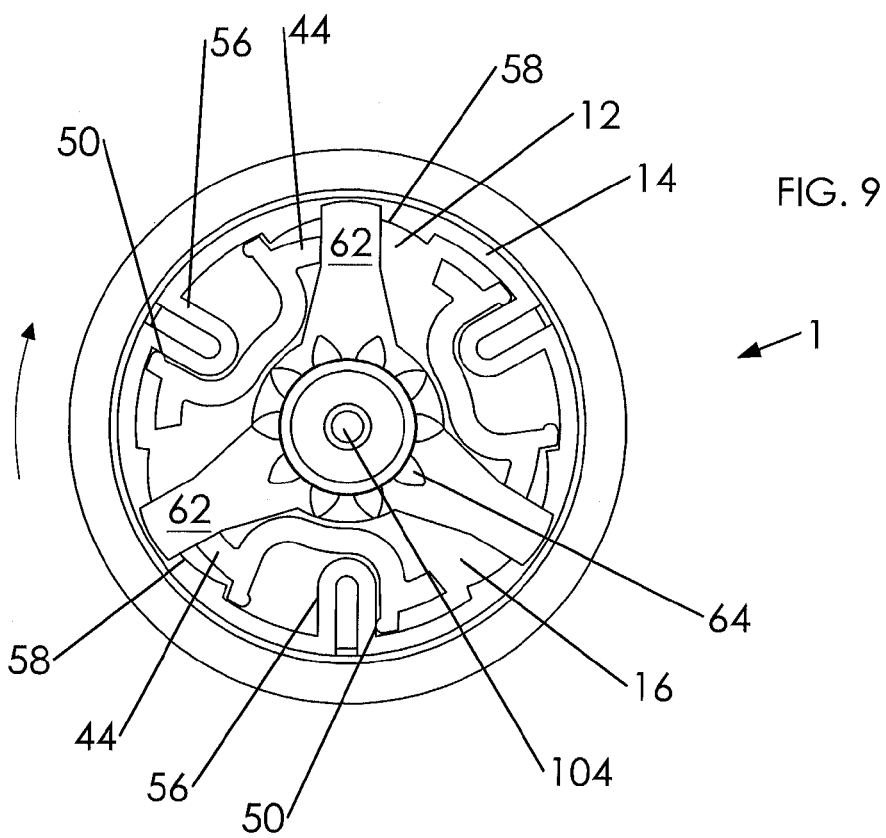
FIG. 9 is a front view of an anti-back drive system with a drive gear being driven in a clockwise direction in accordance with the present invention.

With reference to FIG. 9, the drive shaft 104 is rotating the drive dog 24 (not shown) in a clockwise direction. The drive dog 24 drives the drive ring 12. The plurality of clockwise drive members 44 of the drive ring 12 contact the plurality of drive fingers 62 and drive the output pinion 16. The plurality of clockwise ring projections 50 also contact the plurality of inward facing loop projections 56 to drive the lock ring 14 in a clockwise direction. The plurality of clockwise ring projections 50 contacting the plurality of inward facing loop projections 56, while driving also decreases a width "Z" of the plurality of inward facing loop projections 56, which results in a perimeter of the lock ring 14 being reduced in magnitude. The reduced perimeter allows the lock ring 14 to rotate freely when driven by the plurality of clockwise ring projections 50.

The plurality of drive fingers 62 remain in the middle of the plurality of inward facing cam surfaces 58. The drive gear 64 is available to drive any suitable mating gear in a counterclockwise rotation.

Figure 10:
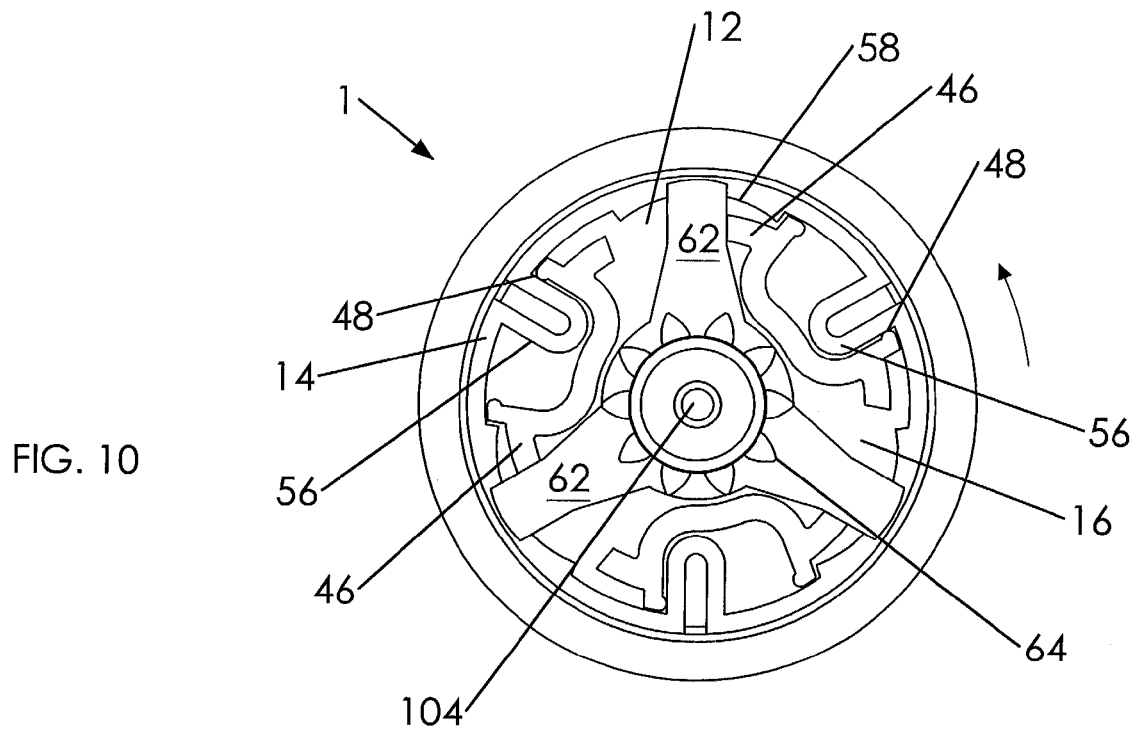
FIG. 10 is a front view of an anti-back drive system with a drive gear being driven in a counterclockwise direction in accordance with the present invention.

With reference to FIG. 10, the drive shaft 104 is rotating the drive dog 24 (not shown) in a counterclockwise direction. The plurality of counterclockwise drive members 46 of the drive ring 12 contact the plurality of drive fingers 62 and drive the output pinion 16. The plurality of counterclockwise ring projections 48 also contact the plurality of inward facing loop projections 56 to drive the lock ring 14. The plurality of counterclockwise ring projections 48 contacting the plurality of inward facing loop projections 56, while driving also decreases the width "Z" of the plurality of inward facing loop projections 56, which results in a perimeter of the lock ring 14 being reduced in magnitude. The reduced perimeter allows the lock ring 14 to rotate freely when driven by the plurality of counterclockwise ring projections 48. The plurality of drive fingers 62 remain in the middle of the plurality of inward facing cam surfaces 58. The drive gear 64 is available to drive any suitable mating gear in a clockwise rotation.

Figure 11:
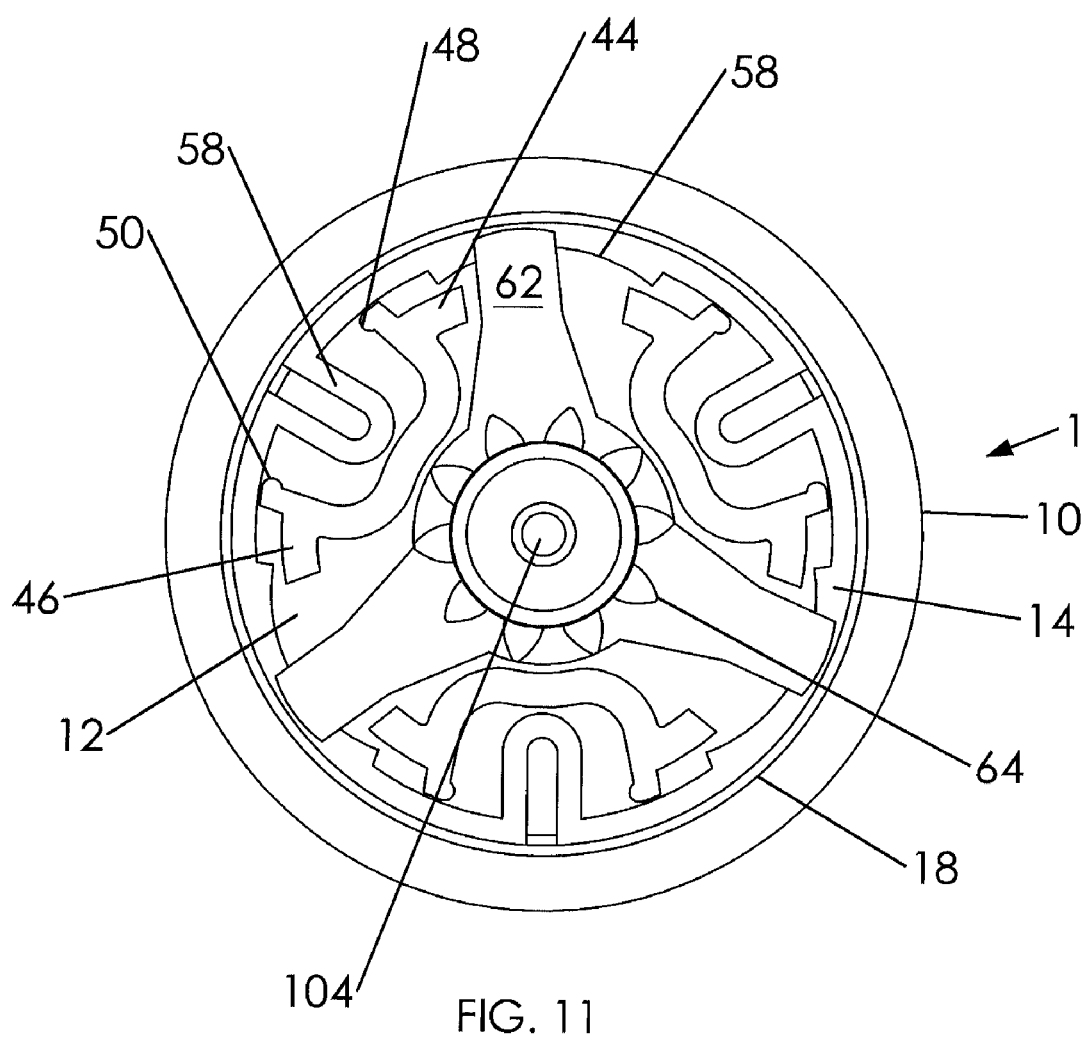
FIG. 11 is a front view of an anti-back drive system, after electric current to an electric motor has been turned-off in accordance with the present invention.

With reference to FIG. 11, the drive shaft 104 stops rotating the drive dog 24 (not shown). The plurality of drive members 44, 46 do not contact the plurality of drive fingers 62 to drive the output pinion 16. The plurality of ring projections 48, 50 do not contact the plurality of inward facing loop projections 56. The curved end 66 of each drive finger 62 contacts an end of the inward facing cam surface 58, which causes an outside perimeter of the lock ring 14 to contact the drive counterbore 18 and bind therewith. The result is that the drive gear 64 can no longer be rotated in either direction by back driving torque applied to the drive gear 64 by a mating gear.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. Anti-back drive system comprising:
    a drive housing includes a drive counterbore, said drive housing is secured to a motor, a drive shaft of the motor extends into said drive counterbore;
    a drive ring includes a plurality of drive projections, said drive ring is secured to the drive shaft;
    a lock ring includes a plurality of inward facing projections and a plurality of inward facing cam surfaces; and
    an output pinion includes a plurality of drive fingers and a drive gear, said plurality of drive fingers extend radially outward from said output pinion, ends of said plurality of drive fingers are sized to be received by said plurality of inward facing cam surfaces, a lip retainer extends from at least one of said plurality of drive fingers, said lip retainer axially retains said lock ring, said output pinion is retained on the drive shaft, wherein at least one of said plurality of drive projections drives at least one of said plurality of drive fingers.

2. The anti-back drive system of claim 1, further comprising:
    a drive dog is attached to the drive shaft, said drive ring includes a cavity for receiving said drive dog.

3. The anti-back drive system of claim 1 wherein:
    each one of said plurality of drive projections includes a substantially C-shaped base member, a clockwise drive member and a counterclockwise drive member, said clockwise drive member extends from one end of said substantially C-shaped projection, said counterclockwise drive member extends from the other end of said substantially C-shaped base member.

4. The anti-back drive system of claim 3 wherein:
a counterclockwise ring projection extends from substantially behind said clockwise drive member, a clockwise ring projection extends from substantially behind said counterclockwise drive member.

5. The anti-hack drive system of claim 1 wherein:
each one of said plurality of inward facing cam surfaces is formed between two adjacent of said plurality of inward facing projections.

6. The anti-back drive system of claim 1 wherein:
each one of said plurality of inward facing projections includes an open end and a closed end, said open end decreases in width when driven by one of said plurality of drive projections.

7. Anti-back drive system comprising:
a drive housing includes a drive counterbore, said drive housing is secured to a motor, a drive shaft of the motor extends into said drive counterbore;
a drive ring includes a plurality of drive projections, said drive ring is secured to the drive shaft, each one of said plurality of drive projections includes a substantially C-shaped base member, a clockwise drive member and a counterclockwise drive member, said clockwise drive member extends from one end of said substantially C-shaped projection, said counterclockwise drive member extends from the other end of said substantially C-shaped base member;
a lock ring includes a plurality of inward facing projections and a plurality of inward facing cam surfaces; and
an output pinion includes a plurality of drive fingers and a drive gear, said plurality of drive fingers extend radially outward from said output pinion, ends of said plurality of drive fingers are sized to be received by said plurality of inward facing cam surfaces, said output pinion is retained on the drive shaft, wherein at least one of said drive members drives at least one of said plurality of drive fingers.

8. The anti-back drive system of claim 7, further comprising:
a drive dog is attached to the drive shaft, said drive ring includes a cavity for receiving said drive dog.

9. The anti-back drive system of claim 7 wherein:
a counterclockwise ring projection extends from substantially behind said clockwise drive member, a clockwise ring projection extends from substantially behind said counterclockwise drive member.

10. The anti-back drive system of claim 7 wherein:
each one of said plurality of inward facing cam surfaces is formed between two adjacent of said plurality of inward facing projections.

11. The anti-back drive system of claim 7 wherein:
each one of said plurality of inward facing projections includes an open end and a closed end, said open end decreases in width when driven by one of said plurality of drive projections.

12. Anti-back drive system comprising:
a drive housing includes a drive counterbore, said drive housing is secured to a motor, a drive shaft of the motor extends into said drive counterbore;
a drive ring includes a plurality of drive projections, said drive ring is secured to the drive shaft, each one of said plurality of drive projections includes a substantially C-shaped base member;
a lock ring includes a plurality of inward facing projections and a plurality of inward facing cam surfaces; and
an output pinion includes a plurality of drive fingers and a drive gear, said plurality of drive fingers extend radially outward from said output pinion, ends of said plurality of drive fingers are sized to be received by said plurality of inward facing cam surfaces, said output pinion is retained on the drive shaft, wherein one end of said substantially C-shaped base member drives one of said plurality of drive fingers in a clockwise direction, the other end of said substantially C-shaped base member drives one of said plurality of drive fingers in a counterclockwise direction.

13. The anti-back drive system of claim 12, further comprising:
a drive dog is attached to the drive shaft, said drive ring includes a cavity for receiving said drive dog.

14. The anti-back drive system of claim 12 wherein:
each one of said plurality of drive projections includes said substantially C-shaped base member, a clockwise drive member and a counterclockwise drive member, said clockwise drive member extends from one end of said substantially C-shaped projection, said counterclockwise drive member extends from the other end of said substantially C-shaped base member.

15. The anti-back drive system of claim 14 wherein:
a counterclockwise ring projection extends from substantially behind said clockwise drive member, a clockwise ring projection extends from substantially behind said counterclockwise drive member.

16. The anti-back drive system of claim 12 wherein:
each one of said plurality of inward facing cam surfaces is formed between two adjacent of said plurality of inward facing projections.

17. The anti-back drive system of claim 12 wherein:
each one of said plurality of inward facing projections includes an open end and a closed end, said open end decreases in width when driven by one of said plurality of drive projections.

18. The anti-back drive system of claim 12 wherein:
a lip retainer extends from at least one of said plurality of drive fingers, said lip retainer axially retains said lock ring.

* * * * *